United States Patent
Mohammed et al.

(10) Patent No.: US 11,170,638 B2
(45) Date of Patent: Nov. 9, 2021

(54) LOOK AHEAD AUTO DASHCAM (LADCAM) FOR IMPROVED GPS NAVIGATION

(71) Applicant: International Business Machines Corporation, Armonk, NY (US)

(72) Inventors: Wisam Mohammed, Raleigh, NC (US); Nancy Anne Schipon, Apex, NC (US); Jack Patern Yapi, Knightdale, NC (US); Lorin Ullmann, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 16/225,406

(22) Filed: Dec. 19, 2018

(65) Prior Publication Data

US 2020/0202703 A1 Jun. 25, 2020

(51) Int. Cl.
*G08G 1/01* (2006.01)
*G07C 5/00* (2006.01)
*G05D 1/02* (2020.01)
*G01S 19/42* (2010.01)

(52) U.S. Cl.
CPC ............ *G08G 1/0112* (2013.01); *G01S 19/42* (2013.01); *G05D 1/0246* (2013.01); *G05D 1/0276* (2013.01); *G07C 5/008* (2013.01); *G08G 1/0141* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,147,353 B1* | 9/2015 | Slusar | G06Q 40/08 |
| 10,026,314 B1* | 7/2018 | Philosof | H04W 4/02 |
| 10,032,318 B1* | 7/2018 | Ferguson | G07C 5/0891 |
| 10,055,649 B2* | 8/2018 | Grauer | H04N 5/23219 |
| 10,062,290 B2* | 8/2018 | Dry | G08G 1/09675 |
| 10,185,327 B1* | 1/2019 | Konrardy | G05D 1/0231 |
| 2009/0231158 A1* | 9/2009 | Grigsby | H04L 67/1061 |
| | | | 340/902 |

(Continued)

FOREIGN PATENT DOCUMENTS

WO 2001043104 A1 6/2001

OTHER PUBLICATIONS

Darrell Etherington, "Nexar's Vehicle-To-Vehicle Network will Use Dash Cam AI to Prevent Accidents", p. 1, techcrunch; Nov. 15, 2016.

(Continued)

*Primary Examiner* — Dale W Hilgendorf
*Assistant Examiner* — Alexander C. Bost
(74) *Attorney, Agent, or Firm* — Cantor Colburn LLP; Teddi Maranzano

(57) ABSTRACT

A system and method for assisting vehicle traffic. A first vehicle includes a recorder that obtains traffic and a first data communication device that communicates the traffic data. A second vehicle includes a second data communication device that receives the communicated traffic data and navigates based on the communicated traffic data. A server receives the video feed from the recorder of the first vehicle via the first communication device and provides the video feed to the second vehicle via the second communication device.

9 Claims, 7 Drawing Sheets

(56) References Cited

U.S. PATENT DOCUMENTS

| | | | |
|---|---|---|---|
| 2012/0169834 A1 | 7/2012 | Grigsby et al. | |
| 2012/0323474 A1 | 12/2012 | Breed et al. | |
| 2013/0282201 A1* | 10/2013 | Kolodgie | G08G 1/20 701/2 |
| 2014/0022108 A1 | 1/2014 | Alberth, Jr. et al. | |
| 2014/0091949 A1 | 4/2014 | Tickoo et al. | |
| 2014/0309864 A1* | 10/2014 | Ricci | G01C 21/365 701/36 |
| 2014/0341434 A1* | 11/2014 | Lin | B60R 1/00 382/104 |
| 2015/0145995 A1* | 5/2015 | Shahraray | H04L 67/12 348/148 |
| 2015/0178998 A1* | 6/2015 | Attard | G07C 5/008 701/23 |
| 2015/0187216 A1* | 7/2015 | Kwak | G08G 1/163 701/24 |
| 2016/0332574 A1* | 11/2016 | Park | H04N 5/247 |
| 2016/0362050 A1* | 12/2016 | Lee | G06K 9/00805 |
| 2017/0116792 A1* | 4/2017 | Jelinek | G07C 5/085 |
| 2017/0178498 A1* | 6/2017 | Mcerlean | G08G 1/166 |
| 2018/0096602 A1* | 4/2018 | She | G05D 1/0295 |
| 2018/0188738 A1* | 7/2018 | Tatourian | G05D 1/028 |
| 2019/0012908 A1* | 1/2019 | Chun | G06K 9/3233 |
| 2019/0019416 A1* | 1/2019 | Perko | G05D 1/0088 |
| 2019/0143967 A1* | 5/2019 | Kutila | G05D 1/0257 701/23 |

OTHER PUBLICATIONS

Freeman, "Traffic information services: Making your commute better", Crutchfield, [https://www.crutchfield.com/S-Vs2yOyt4ZAr/learn/learningcenter/car/navigation/traffic_services.html] (retrieved Dec. 19, 2018) 8 pages.

\* cited by examiner

LOOK AHEAD AUTO DASHCAM (LADCAM) FOR IMPROVED GPS NAVIGATION

BACKGROUND

The present invention relates to traffic management, and more specifically, to a system and method for sharing video feeds between vehicles in order to extend a visual horizon for a selected vehicle.

In certain driving conditions, visibility for a driver of a vehicle can be reduced to relatively short distances. Such conditions can include poor weather, night-time driving, road obstructions, etc. With such reduced visibility, this situation can be hazardous for the driver. In order to reduce hazardous conditions, there is a need to improve a driver's visibility.

SUMMARY

Embodiments of the present invention are directed to a method for assisting vehicle traffic. The method includes obtaining, via a recorder associated with a first vehicle, traffic data in a vicinity of the first vehicle, transmitting the traffic data, via a first communication device, from the first vehicle to a second communication device, and navigating a second vehicle according to the traffic data at the second communication device.

Embodiments of the present invention are directed to a system for assisting vehicle traffic. The system includes a recorder associated with a first vehicle, the recorder obtaining traffic data at the first vehicle, a first data communication device associated with the first vehicle, configured to obtain and communicate traffic data, a second data communication device receivable of the communicated traffic data, and a second vehicle associated with the second data communication device for navigation based on the communicated traffic data.

Embodiments of the present invention are directed to a system for assisting vehicle traffic. The system includes a first vehicle comprising a video camera and a first communication device, a second vehicle comprising a second communication device and a display for display of a video feed, and a server for receiving the video feed from the video camera of the first vehicle via the first communication device and provide the video feed to the second vehicle via the second communication device.

DETAILED DESCRIPTION

Figure 1:
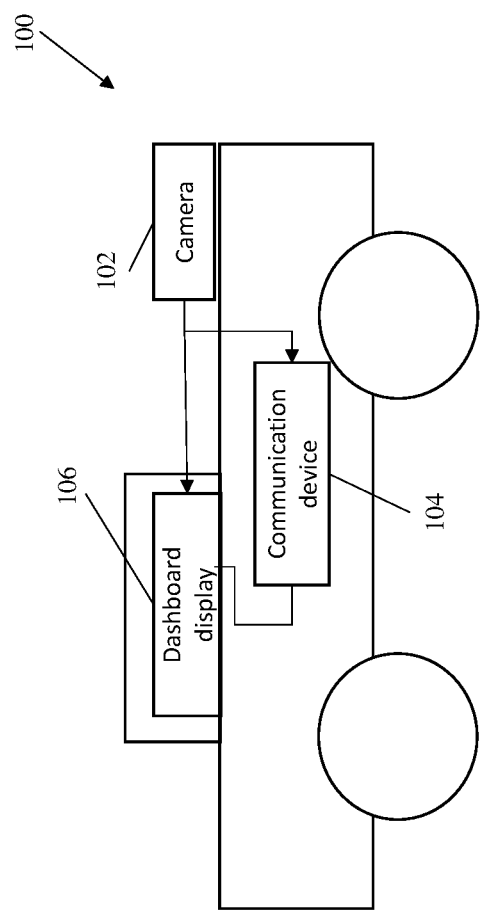
FIG. 1 shows an illustrative look-ahead dashcam-enabled (LADC-enabled) vehicle suitable for use in an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to FIG. 1, FIG. 1 shows an illustrative look-ahead dashcam-enabled (LADC-enabled) vehicle 100 suitable for use in an embodiment of the present invention. The LADC-enabled vehicle 100 includes a data recorder such as a video camera 102, a communication device 104 and a dashboard display 106. The video camera 102 can be a digital camera, or a camera suitable for providing a video feed. The video camera 102 obtains images or a video feed in a vicinity of the vehicle 100 and generally a region that is in front of the vehicle 100. The communication device 104 can be any suitable communication device for transmitting and receiving a video feed. In various embodiments, the communication device 104 transmits images or video obtained at the video camera 102. The images or video can be transmitted along with a camera identification or camera address or GPS location in order that a recipient can identify the camera and/or its location. The communication device 104 can also be receptive to images or a video feed transmitted from a different vehicle or different location. The communication device 104 can also be receptive to map data, Global Positioning Satellite (GPS) data, and other traffic data, audio traffic data radio frequency transmissions of traffic information, etc. The dashboard display 106 displays the video feed or other images to a driver. The images or video feed shown on the dashboard display 106 can be received from the video camera 102 or received at the communication device 104 from a remote location or video camera.

Figure 2:
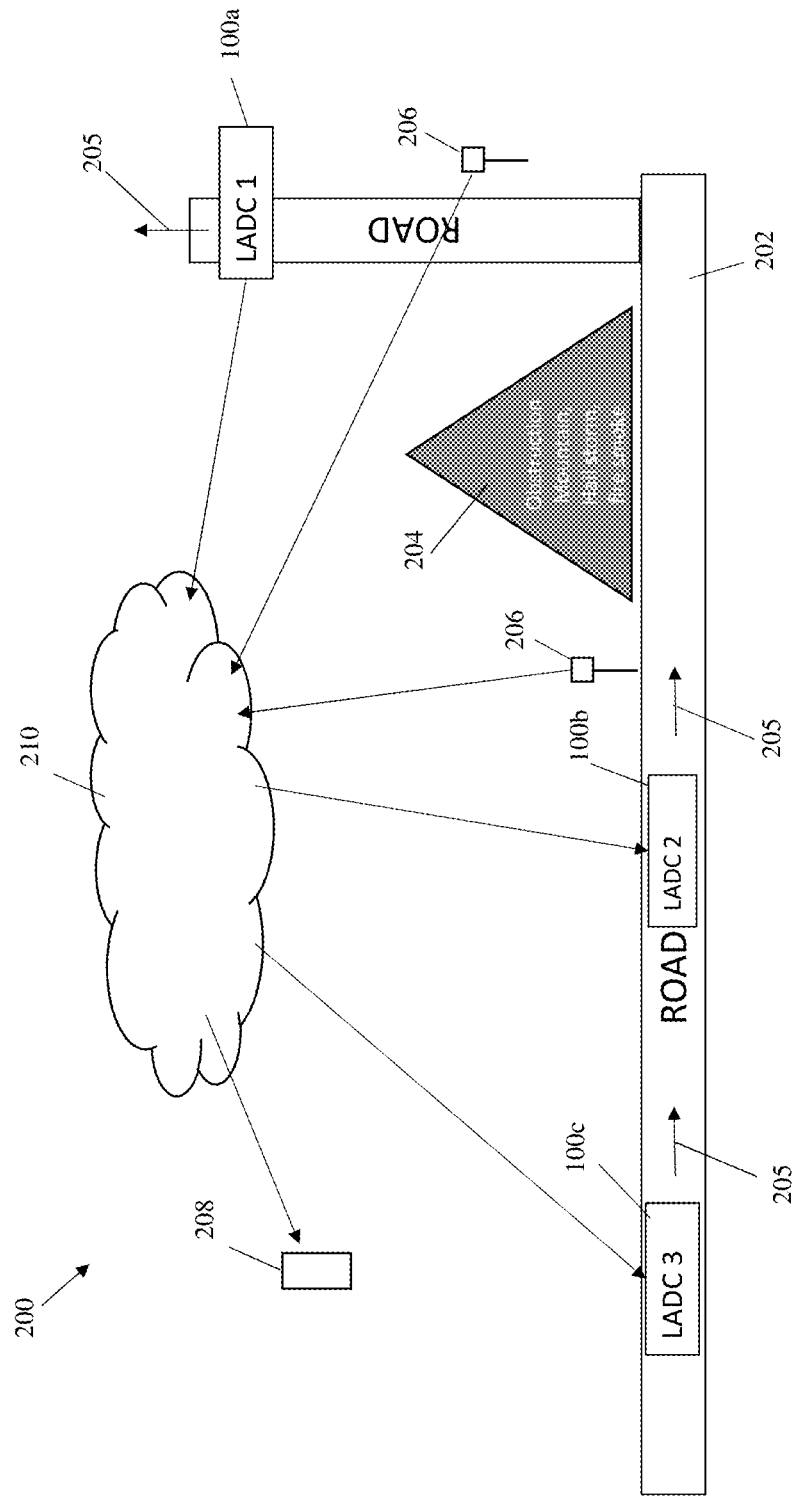
FIG. 2 shows an illustrative system for traffic management using data communication between a plurality of LADC-enabled vehicles.

FIG. 2 shows an illustrative system 200 for traffic management using data communication between a plurality of LADC-enabled vehicles. First vehicle 100a, second vehicle 100b, and third vehicle 100c are LADC-enabled vehicles driving along a section of roadway 202 in a same navigation direction (as indicated by arrows 205). The first vehicle 100a is in front of the second vehicle 100b and third vehicle 100c. The first vehicle 100a has a viewpoint that is visually hidden from second vehicle 100b and third vehicle 100c due to an obstruction 204. The obstruction 204 can be, for example, a mountain, building, storm, fire or smoke, etc. Since the first vehicle 100a is in a position to provide information to the second vehicle 100b and third vehicle 100c in this particular scenario, the first vehicle can be referred to as a "source vehicle" while the second vehicle 100b and third vehicle 100c can be referred to as "recipient vehicles." It should be noted however that each vehicle has the capacity to be either a source vehicle or a recipient vehicle in various scenarios.

In various embodiments, the first vehicle 100a records a video feed and transmits the video feed to a server 210 that is in communication with vehicle 100a. The server 210 can transmit the video feed of the first vehicle 100a to the second vehicle 100b and/or third vehicle 100c so that the second and third vehicles 100b, 100c can display the video feed of the first vehicle 100a at their respective dashboard displays (106, FIG. 1). The second vehicle 100b and third vehicle 100c, therefore, have the ability to perceive traffic conditions at locations that are otherwise visually obstructed (e.g., a location of the first vehicle 100a), thereby extending an effective range of vision for the second vehicle 100b and/or third vehicle 100c. In various embodiments, the server 210 can also transmit the video feed to a device 208 that is not associated with a vehicle, such as a mobile device, smartphone, hand-held tablet, etc. Additional video cameras, such as traffic cameras 206, can provide their video feeds to the server 210, allowing the server 210 to pass these video feeds to any or all of vehicles 100a, 100b, 100c.

Figure 3:
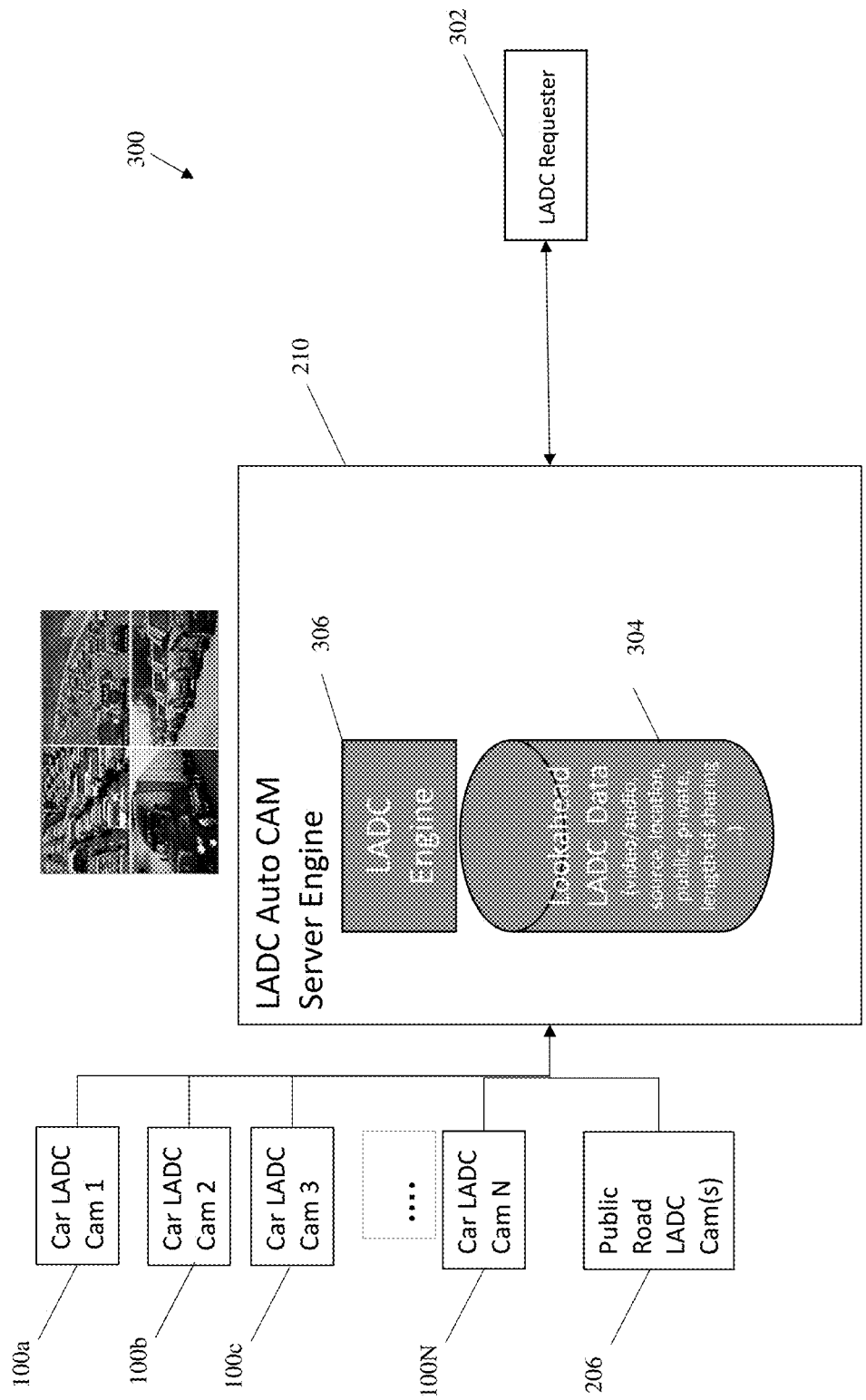
FIG. 3 shows a detailed schematic of the LADC server of FIG. 2.

FIG. 3 shows a detailed schematic 300 of the LADC server 210 of FIG. 2. The server 210 controls the function of the system 200 and the communication of video feeds between vehicles. The server 210 includes at least a look-ahead dash cam (LADC) database 304 and an LADC engine 306. The LADC database 304 receives and stores traffic data, such as video feeds, audio feed, video source information (e.g., video camera identification), and video camera location, for example. The LADC database 304 can also record whether a video feed or traffic is from a public source or a private source. In addition, the LADC database 304 can record a desired or requested length for sharing the video feed.

The LADC engine 306 performs various tasks to operate the communication system. In one aspect, the LADC engine 306 receives a video feed request from a requester 302. The requester 302 can be an LADC-enabled vehicle, a mobile device, or other suitable device that includes a communication device for communication with the server 210. Upon receiving the request for a video feed, the LADC engine 306 performs a video feed request matching algorithm in order to determine which video feed or video feeds to supply to the requester 302. The LADC engine 306 assembles a candidate list of video feeds. The video feeds can be provided to the server 210 via at least one of the LADC-enabled vehicles 100a, 100b, ... 100N or from the public road video cameras 206. Additionally, the video feeds can be provided from another or nearby server. The candidate list can be determined based on various variables. For example, the candidate list can include video feeds within a selected distance or range from the requester 302. The distance can be determined using various methods. For example, the distance or range can be determined based on GPS measurements or straight-line distances, or as a distance confined to a road section or road route. Video cameras on nearby roadways or on the same roadway will have a greater priority within the candidate list.

The LADC engine 306 then determines a score for the members of the candidate list. The score can be used to select a video feed or set of video feeds to provide to the requester 302 by determines which video feed(s) have a high probability of being useful to the requester 302. The score can be based on various variables, such as distance (GPS, etc.) between requester and video camera, which roadway the video camera is located, a popularity rating (as indicated by a voting system from previous user), a quality of the video feed, and a number of times the video feed has been used by other requesters.

In one embodiment, the LADC engine 306 provides a video feed or video feeds having a highest score to the requester 302. In another embodiment, the LADC engine 306 provides the candidate list and their scores to the requester 302 to allow the requester 302 to select a video feed from the candidates list. The LADC engine 306 can also provide alerts to the requester based on LADC video feeds and/or analysis of the video feeds.

Figure 4:
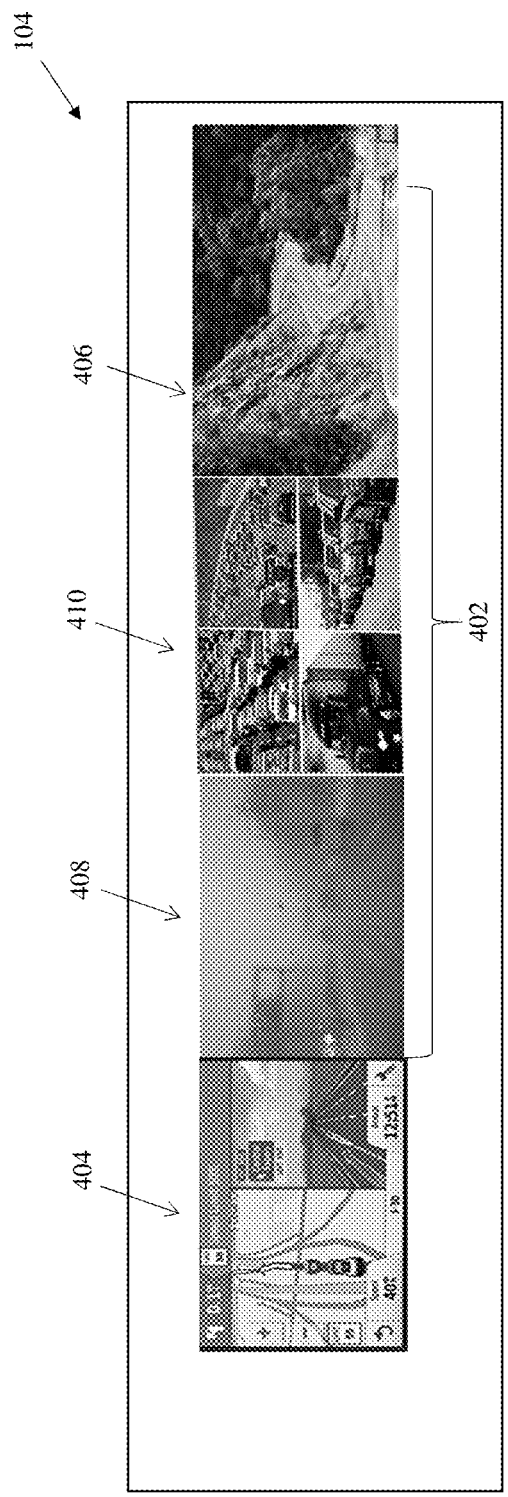
FIG. 4 shows illustrative contents shown at a dashboard display.

FIG. 4 shows illustrative contents shown at a dashboard display 106. The display 106 includes a video feed area 402 and a GPS application or traffic data application 404. The video feed area 402 can include a plurality of video feeds. Video feed 406 can be a video feed from a separate LADC-enabled vehicle, while video 408 can be a video feed from a traffic camera. Additional video feed 410 can be a video feed from a relatively remote location.

Figure 5:
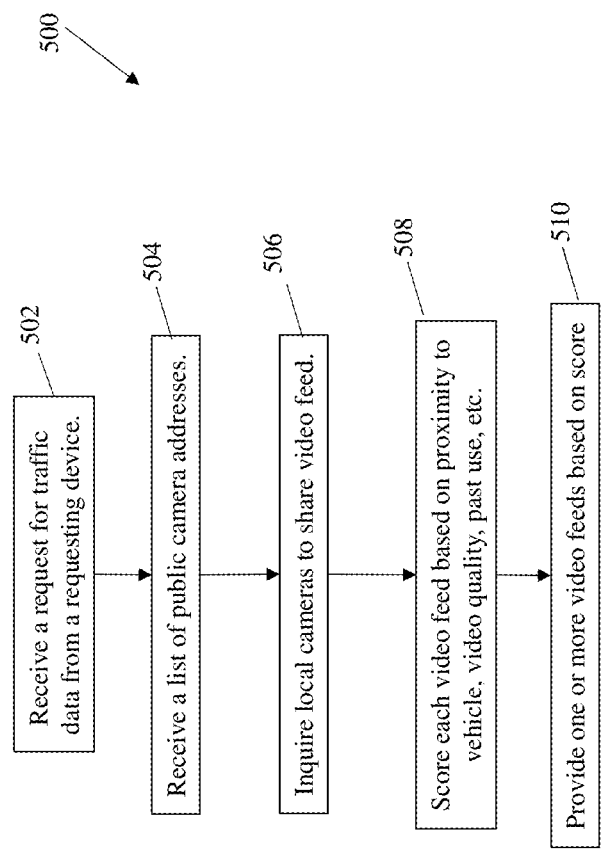
FIG. 5 shows a flowchart illustrating a method for obtaining a video feed, image or other traffic data at a vehicle in an embodiment.

FIG. 5 shows a flowchart 500 illustrating a method for obtaining a video feed, image or other traffic data at a vehicle in an embodiment. In box 502, a requesting device sends a request to a server for a video feed from cameras located away from the vehicle. In box 504, the server retrieves a list of camera addresses that are public and can be viewed. The camera addresses can be stored with associated camera locations, roadways, etc. In box 506, the server can send out a request to non-public camera addresses requesting a video feed. In box 508, the server determines a score for each video feed. The score can be based on a proximity to an area of interest, a video quality, past history of use and/or a cloud-based social scoring of video feeds (i.e., a ranking of the video feeds by previous users or recipients). The score can also include the proximity of the source vehicle to the recipient vehicle, as well as what type or make of the source vehicle. For example, a low-lying compact vehicle will have more visibility issues than a high-lying semi-truck. In box 510, the server provides one or more video feeds to the requesting device based on the score.

Figure 6:
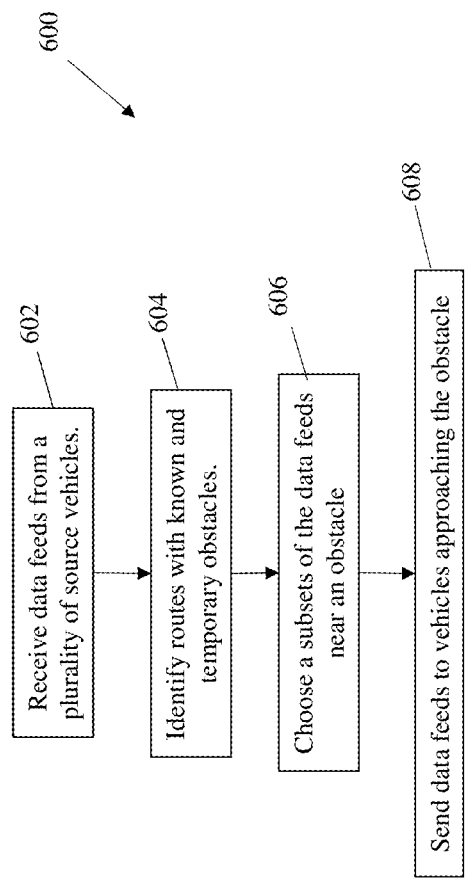
FIG. 6 shows a flowchart illustrating a method for operation of a server to provide a data feed or video feed to vehicles.

FIG. 6 shows a flowchart 600 illustrating a method for operation of a server to provide a data feed or video feed to vehicles. In box 602, the server receives data feeds from a plurality of vehicles. In box 604, the server identifies known and/or temporary obstacles. Known obstacles include tunnels, curves, mountains, and other relatively permanent obstacles. Temporary obstacles can include a rainstorm, fog, trees across a road, a mud slide, an accident, etc. In box 606, the server identifies a subset of the data feeds that are from vehicles near an obstacle. In box 608, the server provides the subset of the data feeds to vehicles that are approaching the obstacle. The server can determine vehicles approaching the obstacle from GPS information of the vehicles, for example. In various embodiments, the data feeds can be provided for a selected time period or based on a GPS position of the vehicle. The data feeds can be provided to only those vehicles approaching the obstacle. The vehicles receiving the data feeds can vote or provide feedback concerning the usefulness of one or more data feeds.

Figure 7:
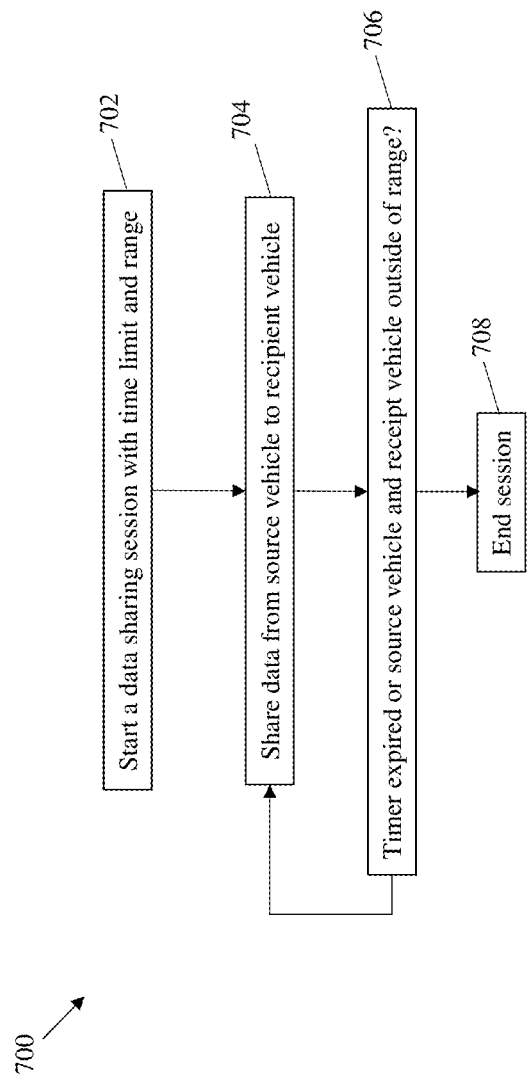
FIG. 7 shows a flowchart illustrating a data sharing session between a source vehicle and a recipient vehicle.

FIG. 7 shows a flowchart 700 illustrating a data sharing session between a source vehicle and a recipient vehicle. In various embodiments, a sharing session can be time-regulated or distance regulated. For example, a sharing session can be ended after a selected amount of time has elapsed or when a distance between source vehicle and recipient vehicle is determined to be too great. At large distances, the data feed from a source vehicle can be of little use to the recipient vehicle In box 702, the server begins a data sharing session having a selected maximum time duration and a maximum separation distance between source vehicle and recipient vehicle. In box 704, the server share data from the source vehicle to the recipient vehicle. In box 706, the server checks to see if the time duration of sharing session has exceeded the maximum time duration or if the distance between the source vehicle and the recipient vehicle exceeds the maximum separation distance. If either of these conditions is true, the method proceeds to box 708 wherein the session ends. Otherwise, the method loops back to box 704, when the server continues to share data.

In operation, each LADC-enabled vehicle can allow the central server access to its video camera in order to obtain the video feed from the vehicle. The video camera can include any of a backup camera, a 360 camera on top of car, or a dashcam in a GPS device, etc. The source vehicle provides the IP address of its camera to the server. A recipient vehicle displays the video feed from the source vehicle at its display in real time.

It should be noted that while the invention is discussed with respect to obtaining and sharing video feeds, other traffic data can also be obtained by suitable recording devices and shared amongst LADC-enabled vehicles, using the systems and methods disclosed herein. The additional traffic data can include, audio feeds, radio frequency transmissions of traffic data, GPS data, etc.

Additional processes also can be included, and it should be understood that the processes depicted herein represent illustrations and that other processes can be added or existing processes can be removed, modified, or rearranged without departing from the scope and spirit of one or more embodiments of the present invention.

The present techniques can be implemented as a system, a method, and/or a computer program product. The computer program product can include a computer readable storage medium (or media) having computer readable program instructions thereon for causing a processor to carry out aspects of one or more embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of one or more embodiments of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments of the present invention.

Aspects of one or more embodiments of the present invention are described herein with reference to flowchart illustrations and/or block diagrams of methods, apparatus (systems), and computer program products according to one or more embodiments of the present invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of one or more embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A method for assisting vehicle traffic, comprising:
    obtaining, via a recorder associated with a first vehicle, traffic data in a vicinity of the first vehicle;
    receiving the traffic data, from a first communication device of the first vehicle, by a server;
    receiving a request for traffic data at the server from a second vehicle;
    compiling, by the server, a candidate list of traffic data from a plurality of recorders and assigning a score for each of the plurality of recorders in the candidate list, wherein the candidate list only includes traffic data from vehicles within a selected distance from the second vehicle; and
    providing a portion of the traffic data to the second vehicle in response to the request, wherein the portion of the traffic data provided is based upon the score of each of the plurality of recorders in the candidate list and wherein the score is based on a distance between the first vehicle and the second vehicle, a quality of the video feed, and a ranking of the video feed by previous recipients,
    wherein the portion of the traffic data is displayed to a user of the second vehicle with an indication of the score
    wherein the portion of the traffic data is displayed to a user of the second vehicle with an indication of the score,
    wherein the score is further based on a type of the second vehicle, wherein the type of the second vehicle indicates a height of a camera in the second vehicle.

2. The method of claim 1, wherein the traffic data includes at least one of: (i) an image; (ii) a video feed of traffic in the vicinity of the first vehicle; (iii) a video feed from a public access video camera; and (iv) an audio feed.

3. The method of claim 1, further comprising displaying the traffic data from the first vehicle at a display of the second vehicle.

4. A system for assisting vehicle traffic, comprising:
    a recorder associated with a first vehicle, the recorder obtaining traffic data at the first vehicle;
    a first data communication device associated with the first vehicle, configured to obtain and communicate traffic data;
    a second data communication device receivable of the communicated traffic data;
    a second vehicle associated with the second data communication device, wherein the second vehicle is navigated based on the communicated traffic data; and
    a server for receiving traffic data from the first communication device and transmitting the traffic data to the second communication device, wherein the server is configured to:
        receive a request for traffic data from the second vehicle;

compile a candidate list of traffic data from a plurality of recorders and assign a score for each of the plurality of recorders in the candidate list, wherein the candidate list only includes traffic data from vehicles within a selected distance from the second vehicle; and provide a portion of the traffic data to the second vehicle in response to the request, wherein the portion of the traffic data provided is based upon the score of each of the plurality of recorders in the candidate list and wherein the score is based on a distance between the first vehicle and the second vehicle, a quality of the video feed, and a ranking of the video feed by previous recipients, wherein the portion of the traffic data is displayed to a user of the second vehicle with an indication of the score wherein the portion of the traffic data is displayed to a user of the second vehicle with an indication of the score, wherein the score is further based on a type of the second vehicle, wherein the type of the second vehicle indicates a height of a camera in the second vehicle.

5. The system of claim 4, wherein the traffic data includes at least one of: (i) an image; and (ii) a video feed of traffic in a vicinity of the first vehicle; (iii) a video feed from a public access video camera; and (iv) an audio feed.

6. The system of claim 4, wherein the second vehicle includes a display for displaying the traffic data from the first vehicle.

7. A system for assisting vehicle traffic, comprising:
a first vehicle comprising a video camera and a first communication device;
a second vehicle comprising a second communication device and a display for display of a video feed; and
a server for receiving the video feed from the video camera of the first vehicle via the first communication device and providing the video feed to the second vehicle via the second communication device, wherein the server is configured to:
receive a request from the second communication device;
compile a candidate list of traffic data from a plurality of recorders and assign a score for each of the plurality of recorders in the candidate list, wherein the candidate list only includes traffic data from vehicles within a selected distance from the second vehicle; and
provide a portion of the traffic data to the second communication device in response to the request, wherein the portion of the traffic data provided is based upon the score of each of the plurality of recorders in the candidate list and wherein the score is based on a distance between the first vehicle and the second vehicle, a quality of the video feed, and a ranking of the video feed by previous recipients, wherein the portion of the traffic data is displayed to a user of the second vehicle with an indication of the score wherein the portion of the traffic data is displayed to a user of the second vehicle with an indication of the score, wherein the score is further based on a type of the second vehicle, wherein the type of the second vehicle indicates a height of a camera in the second vehicle.

8. The system of claim 7, wherein the score is further based on a past history of use of the video feed.

9. The system of claim 7, wherein the server provides the candidate list to the second vehicle, receives a request for a video feed from the candidate list and provides the requested video feed to the second vehicle.

* * * * *